G. Tanner,
Cow's Tail-Holder.

No. 104,661. Patented June 21, 1870.

Witnesses:
Chas. W. Kaine
C. M. Carr

Inventor:
George Tanner
by his Attorney
Chas. Foster

UNITED STATES PATENT OFFICE.

GEORGE TANNER, OF FREETOWN, NEW YORK.

IMPROVEMENT IN COW-TAIL HOLDERS.

Specification forming part of Letters Patent No. 104,661, dated June 21, 1870.

*To all whom it may concern:*

Be it known that I, GEORGE TANNER, of Freetown, in the county of Courtland and State of New York, have invented a new and Improved Mode of Holding Still or Confining the Tails of Cows while being Milked; and I do hereby declare that the following is a full, clear, and exact description of the construction and operation thereof, reference being had to the accompanying drawings, in which—

Figure 1:
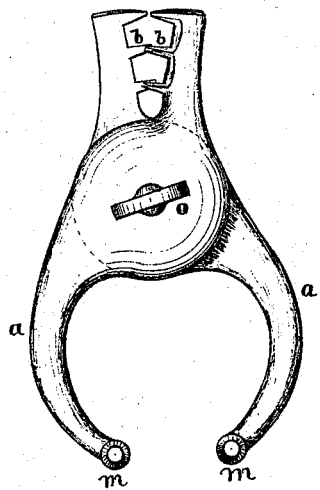
Figure 2:
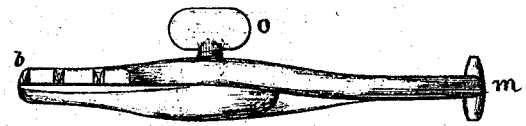
Figure 3:
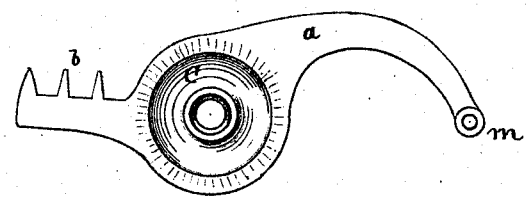

Figure 1 represents the device entire, and Figs. 2 and 3 parts thereof.

The object sought and attained in my invention is to connect and couple together the tail and one of the hind legs of the animal, and thus confine the tail and prevent its switching while milking.

$a\ a$ represent the two main parts of the device, having a broad circular bearing at $c$. Projecting from this bearing in one direction are the toothed arms $b\ b$, and in the opposite direction are curved arms, terminating at $m\ m$, with knobs elongated transversely to the main parts. These pieces are held together by the thumb-screw $o$, and work somewhat like a pair of calipers.

A piece of rubber, or other packing, may be placed between the bearings $c\ c$, so that the screw may hold the parts more firmly.

To use this device the tail is brought near the hind leg, just above the gambrel joint, where the large cord of the leg stands out most prominently. The toothed ends of the device mesh into the hair of the tail, while the curved arms clasp loosely about the large cord aforesaid, the knobbed ends resting in the depression in the leg. The thumb-screw is then tightened, and the tail and leg are coupled until the screw is turned back and loosened.

What I claim, and desire to secure by Letters Patent, is—

The toothed and curved pieces or parts $a\ a$, when made substantially as described, in combination with the thumb-screw $o$, for the uses and purposes set forth.

In testimony whereof I have signed my name to this specification in the presence of two subscribing witnesses.

GEORGE TANNER.

Witnesses:
WM. J. MANTANYE,
J. L. WATROUS.